(12) United States Patent
Martin et al.

(10) Patent No.: US 11,646,825 B2
(45) Date of Patent: *May 9, 2023

(54) TRANSMITTING NODE, RECEIVING NODE, METHODS AND MOBILE COMMUNICATIONS SYSTEM

(71) Applicant: SONY CORPORATION, Tokyo (JP)

(72) Inventors: Brian Alexander Martin, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 154 days.

This patent is subject to a terminal disclaimer.

(21) Appl. No.: 17/176,137

(22) Filed: Feb. 15, 2021

(65) Prior Publication Data

US 2021/0167896 A1 Jun. 3, 2021

Related U.S. Application Data

(63) Continuation of application No. 16/346,543, filed as application No. PCT/EP2017/077922 on Oct. 31, 2017, now Pat. No. 10,924,219.

(30) Foreign Application Priority Data

Nov. 11, 2016 (EP) ..................... 16198536

(51) Int. Cl.
*H04L 1/16* (2006.01)
*H04L 1/18* (2006.01)
(Continued)

(52) U.S. Cl.
CPC ............ *H04L 1/1685* (2013.01); *H04L 1/187* (2013.01); *H04L 1/1874* (2013.01); *H04W 72/1284* (2013.01)

(58) Field of Classification Search
CPC ..... H04L 1/1685; H04L 1/187; H04L 1/1874; H04W 72/1284
See application file for complete search history.

(56) References Cited

U.S. PATENT DOCUMENTS

| | | |
|---|---|---|
| 9,723,514 B2 | 8/2017 | Torsner et al. |
| 2003/0099305 A1 | 5/2003 | Yi et al. |
| 2009/0028126 A1 | 1/2009 | Meylan |

FOREIGN PATENT DOCUMENTS

| | | |
|---|---|---|
| EP | 1424815 A1 | 6/2004 |
| GB | 2425923 A | 11/2006 |

OTHER PUBLICATIONS

International Search Report and Written Opinion dated Jan. 26, 2018 for PCT/EP2017/077922 filed on Oct. 31, 2017, 11 pages.
(Continued)

*Primary Examiner* — Melvin C Marcelo
(74) *Attorney, Agent, or Firm* — Xsensus LLP

(57) ABSTRACT

A transmitting node operating with a mobile communications system comprises transmitter circuitry configured to transmit signals representing protocol data units formed from one or more service data units via a wireless access interface of the mobile communications system to a receiving node of the mobile communications system according to an automatic repeat request process, receiver circuitry configured to receive signals from the receiving node via the wireless access interface, controller circuitry configured to control the transmitter circuitry to transmit the signals and to control the receiver circuitry to receive the signals, and a buffer configured to store data conveyed by or representing the protocol data units for transmission to the receiving node according to the automatic repeat request process, wherein each of the protocol data units has a sequence number defining their position in a predetermined order.

17 Claims, 9 Drawing Sheets

(51) Int. Cl.
H04W 72/12 (2009.01)
H04L 1/1607 (2023.01)
H04L 1/1867 (2023.01)

(56) References Cited

OTHER PUBLICATIONS

3GPP, "3rd Generation Partnership Project; Technical Specification Group Radio Access Network; Evolved Universal Terrestrial Radio Access (E-UTRA); Radio Link Control (RLC) protocol specification", Release 13, 3GPP TS 36.322 V13.2.0, Jun. 2016, pp. 1-45.
Huawei et al., "Introduction of mobility enhancement UE capabilities", 3GPP TSG-RAN2 Meeting #95bis R2-166398, Kaohsiung, Oct. 10-14, 2016, 2 pages.
Rossi et al., "On the UMTS RLC Parameters Setting and their Impact on Higher Layers Performance", 6 pages.
Alcaraz et al., "Optimizing TCP and RLC Interaction in the UMTS Radio Access Network", IEEE Network, Mar.-Apr. 2006, pp. 2-11.
Share Technote, "RLC", Forum Institut Seminare, pp. 1-33.
Holma et al., "LTE for UMTS OFDMA and SC-FDMA Based Radio Access", Wiley 2009, System Architecture Based on 3GPP SAE, 11 pages.
Nokia et al., "On usage of PDCP SN at RLC for NR", 3GPP TSG-RAN WG2 Meeting #95bis R2-166159, Kaohsiung, Taiwan, Oct. 10-14, 2016, 3 pages.
Huawei et al., "L2 Reordering and Retransmission Functions", 3GPP TSG-RAN WG2 Meeting No. 95bis R2-166195, Kaohsiung, Oct. 10-14, 2016, 5 pages.
Fujitsu, "Considerations on the segmentation function in NR", 3GPP TSG-RAN WG2 Meeting No. 95b R2-166488, Kaohsiung, Oct. 10-14, 2016, pp. 1-3.
Samsung, "Segment Offset-based Segmentation for NR", 3GPP TSG-RAN WG2 Meeting No. 95bis R2-166511, Kaohsiung, Taiwan, Oct. 10-14, 2016, 4 pages.
Ericsson, "Second level retransmissions in NR", 3GPP TSG-RAN WG2 #95bis Tdoc R2-166828, Kaohsiung, Taiwan, Oct. 10-14, 2016, pp. 1-5.
Intel Corporation, "Report of email discussion: [95#27][LTE/NR] Reordering (Intel)", 3GPP TSG-RAN WG2 Meeting #95bis R2-166883, Kaohsiung, Oct. 10-14, 2016, pp. 1-18.
Qualcomm Incorporated et al., "Way forward on U-plane modifications to LTE baseline", 3GPP TSG-RAN2#95bis R2-167143, Kaohsiung, Taiwan, Oct. 10-14, 2016, 4 pages.
Samsung et al., "On concatenation in NR", 3GPP TSG-RAN WG2 Meeting #95-BIS R2-167199, Kaohsiung, Taiwan, Oct. 10-14, 2016, 1 page.
NTT DOCOMO, "Revision of SI: Study on New Radio Access Technology", 3GPP TSG RAN Meeting No. 73 RP-161596 revision of RP-161214, New Orleans, Sep. 19-22, 2016, 7 pages.

TRANSMITTING NODE, RECEIVING NODE, METHODS AND MOBILE COMMUNICATIONS SYSTEM

CROSS-REFERENCE TO RELATED APPLICATIONS

The present application is a continuation application based on Ser. No. 16/346,543, filed May 1, 2019, which is a national stage application based on PCT filing PCT/EP2017/077922 filed Oct. 31, 2017 which claims priority to EP 16198536.1 filed Nov. 11, 2016, the entire contents of each are incorporated herein by reference.

BACKGROUND

Field of Disclosure

The present disclosure relates to mobile communications systems in which signals comprising protocol data units (PDUs) are transmitted from a transmitting node to a receiving node.

The present application claims the Paris Convention priority of European patent application EP16198536.1, the contents of which are hereby incorporated by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging.

There is therefore expected to be a desire for future wireless communications networks, which may be referred to as 5G or new radio (NR) system/new radio access technology (RAT), networks, to efficiently support connectivity for a wide range of devices associated with different applications with different characteristic data traffic profiles, resulting in different devices have different operating characteristics/requirements, such as:
  Low latency
  High data rates
  Millimetre wave spectrum use
  High density of network nodes (e.g. small cell and relay nodes)
  Large system capacity
  Large numbers of devices (e.g. MTC devices/Internet of Things devices)
  High reliability (e.g. for vehicle safety applications, such as self-driving cars).
  Low device cost and energy consumption
  Flexible spectrum usage
  Flexible mobility The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G or LTE network). There is a desire to provide mobile communications systems in which processing overheads of devices may be reduced, leading to improved efficiency and performance. Methods of doing so are addressed by embodiments of the present technique.

SUMMARY OF THE DISCLOSURE

According to embodiments of the present technique, there is provided a transmitting node operating with a mobile communications system. The transmitting node comprises transmitter circuitry configured to transmit signals representing protocol data units formed from one or more service data units via a wireless access interface of the mobile communications system to a receiving node of the mobile communications system according to an automatic repeat request process, receiver circuitry configured to receive signals from the receiving node via the wireless access interface, controller circuitry configured to control the transmitter circuitry to transmit the signals and to control the receiver circuitry to receive the signals, and a buffer configured to store data conveyed by or representing the protocol data units for transmission to the receiving node according to the automatic repeat request process, wherein each of the protocol data units has a sequence number defining their position in a predetermined order. The controller circuitry is configured in combination with the transmitter circuitry and the buffer to detect, based on the sequence number of one or more of the protocol data units, whether predetermined criteria are satisfied, and in response to transmit a polling bit to the receiving node in the one or more of the protocol data units for which the sequence number satisfies the predetermined criteria.

According to embodiments of the present technique, there is provided a receiving node operating with a mobile communications system. The receiving node comprises receiver circuitry configured to receive signals representing protocol data units formed from one or more service data units via a wireless access interface of the mobile communications system from a transmitting node of the mobile communications system according to an automatic repeat request process, transmitter circuitry configured to transmit signals to the transmitting node via the wireless access interface, and controller circuitry configured to control the transmitter circuitry to transmit the signals and to control the receiver circuitry to receive the signals, wherein each of the protocol data units has a sequence number defining their position in a predetermined order. The controller circuitry is configured in combination with the receiver circuitry to detect based on the sequence number of one or more of the protocol data units, that predetermined criteria are satisfied, and in response to transmit a status report message comprising a negative acknowledgement for one or more protocol data units which were not successfully received. In some arrangements of this embodiment of the present technique, the controller is configured in combination with the receiver to receive a polling bit from the transmitting node along with each of the one or more of the protocol data units for which the predetermined criteria are satisfied.

Further embodiments of the present disclosure relate to a method of controlling communications at a transmitting node operating with a mobile communications system, a method of controlling communications at a receiving node operating with a mobile communications system, circuitry for a transmitting node operating with a mobile communications system, circuitry for a receiving node operating with a mobile communications system and a mobile communications system comprising a transmitting node and a receiving node.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Conventional Communications System and Relay Nodes

Figure 1:
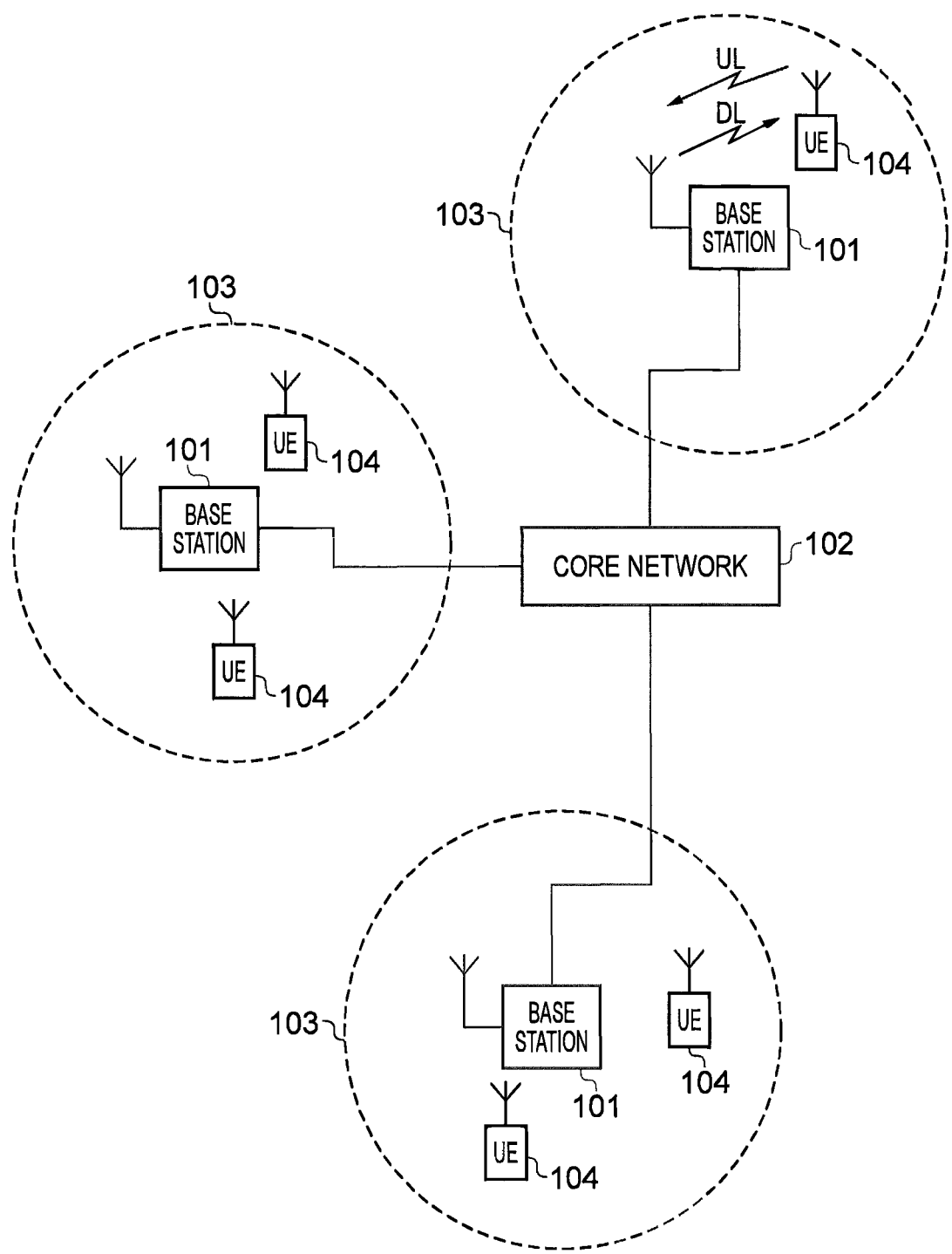
FIG. 1 is a schematic block diagram illustrating an example of a conventional LTE-based mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short), and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Communications System

Figure 2A:
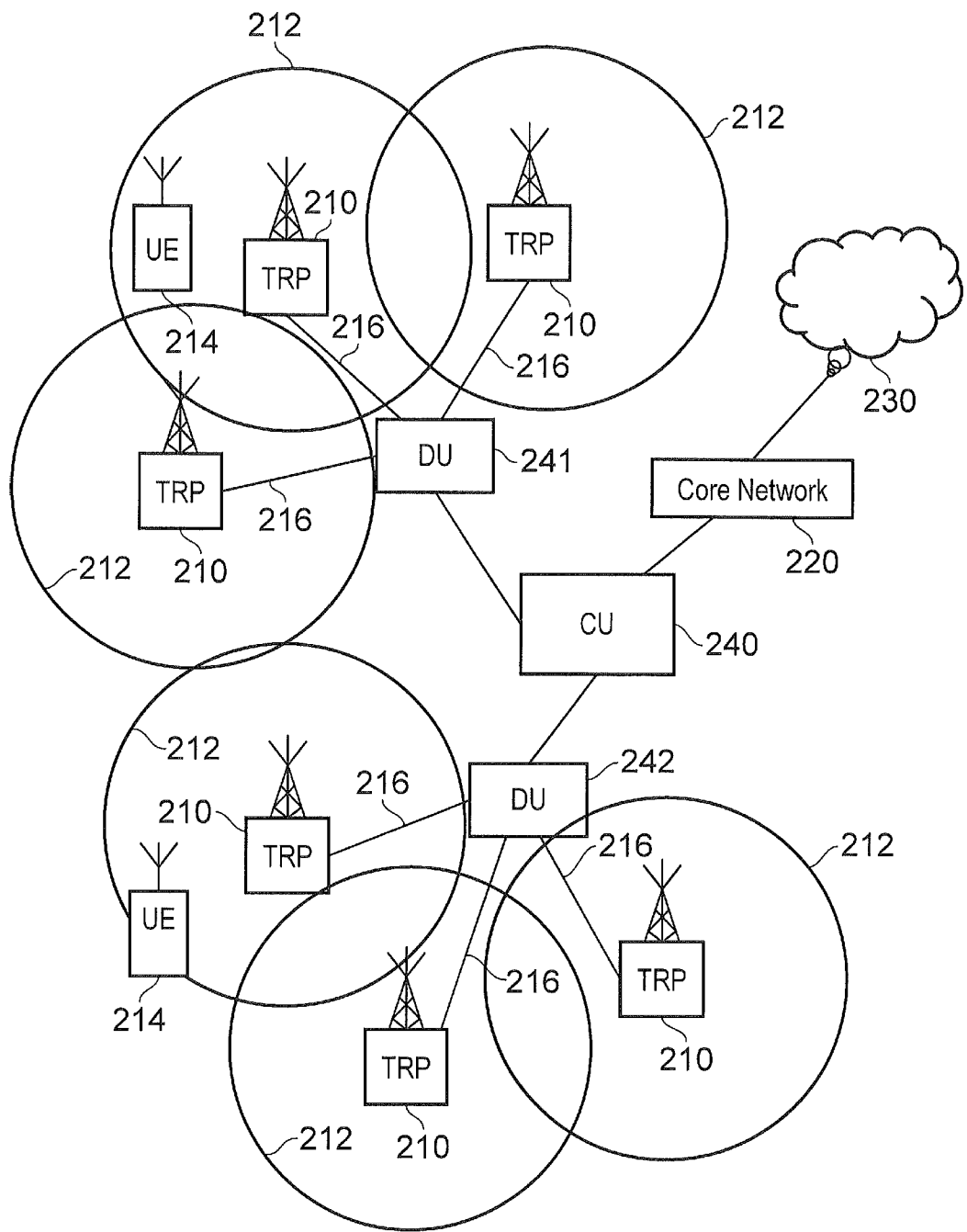
FIG. 2A is a schematic block diagram illustrating an example of a mobile telecommunication system with architectural components corresponding to that of an enhanced New Radio (NR) or 5G network.

An example configuration of a wireless communications network which uses some of the terminology proposed for NR and 5G is shown in FIG. 2A. In FIG. 2A a plurality of transmission and reception points (TRPs) 210 are connected to distributed control units (DUs) 241, 242 by a connection interface represented as a line 216. Each of the TRPs 210 is arranged to transmit and receive signals via a wireless access interface within a radio frequency bandwidth available to the wireless communications network. Thus within a range for performing radio communications via the wireless access interface, each of the TRPs 210, forms a cell of the wireless communications network as represented by a dashed line 212. As such wireless communications devices 214 which are within a radio communications range provided by the cells 210 can transmit and receive signals to and from the TRPs 210 via the wireless access interface. Each of the distributed control units 241, 242 are connected to a coordinating unit (CU) 240 via an interface. The coordinating unit 240 is then connected to the a core network 220 which may contain all other functions required to transmit data for communicating to and from the wireless communications devices and the core network 220 may be connected to other networks 230.

The elements of the wireless access network shown in FIG. 2A may operate in a similar way to corresponding elements of an LTE network as described with regard to the example of FIG. 1. It will be appreciated that operational aspects of the telecommunications network represented in FIG. 2A, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2A may in part have a corresponding functionality to a base station or eNodeB of an LTE network. Similarly the communications devices 214 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Figure 2B:
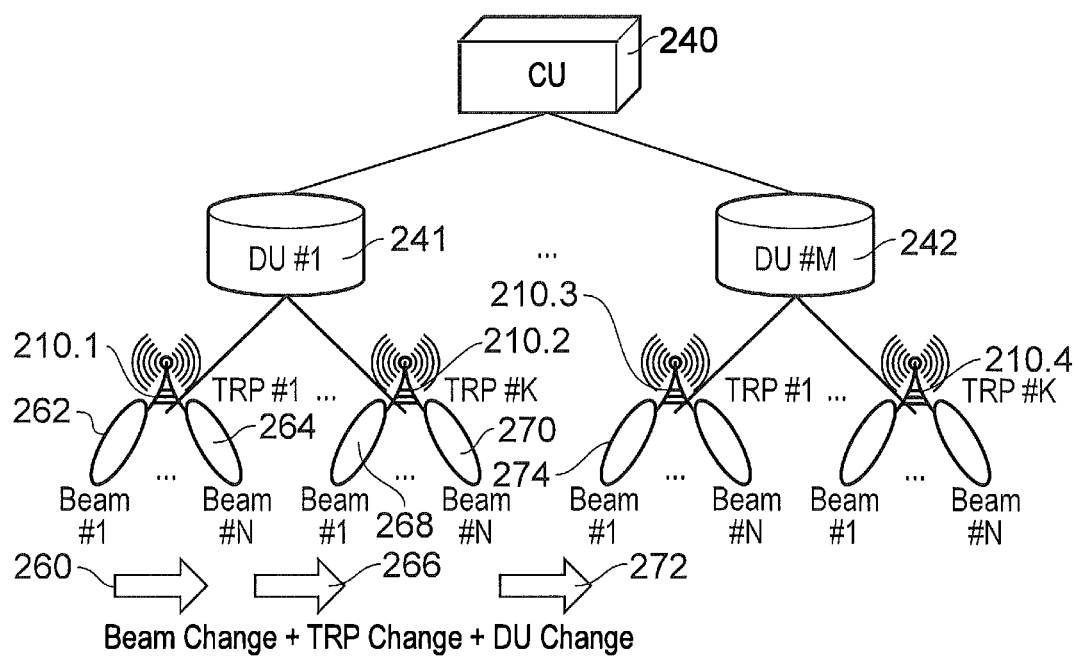
FIG. 2B is a simplified representation of the communications network shown in FIG. 2A, illustrating a process of handover of a communications device as it travels through the mobile communications network.

FIG. 2B provides a schematic representation of the wireless communications network shown in FIG. 2A arranged to illustrate a scenario of communication with a UE 214 which is mobile. As will be appreciated if a UE 214 is transmitting from left to right and detecting the beams formed by the TRPs 210.1, 210.2 the UE 214 may be able to detect each of the beams in turn but not contemporaneously. Accordingly, the UE 214 should be arranged to hand over between different TRPs to transmit and/or receive signals represented as different beams as it travels from a left hand side of FIG. 2B to the right hand side. Thus as shown by a first arrow 260 as a UE 214 travels from an area where it can receive a first of the beams 262 to an area where it can receive a second of the beams 264, the UE 214 should hand over transmission and reception from the first beam 262 to the second beam 264. However as represented by a second arrow 266, as the UE 214 travels further to detect a first beam 268 of a second TRP 210.2, then the UE 214 should hand over from the first TRP 201.1 to the second TRP 210.2. Furthermore as the UE 214 travels further 272 to detect a further beam 274 transmitted by a third TRP 210.3, then the UE 214 should hand over from a first of the distributed units 241 to a second the distributed units 242. More details of the handover arrangement are disclosed in [2].

3GPP have started the standardisation process of the new 5G radio access technology as described with reference to FIGS. 2A and 2B above. A RAN study item [3] provides justification and objectives with the development of NR systems, as described in the text taken from [3] below. "Work has started in ITU and 3GPP to develop requirements and specifications for new radio (NR) systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for NR System. In addition, a joint RAN-SA document [SP-150149] from RAN #67 outlines the "NR" timeline for 3GPP, further detailed in the September RAN workshop on NR [RWS-150073].

3GPP has to identify and develop the technology components needed for successfully standardizing the NR system timely satisfying both the urgent market needs, and the more long-term requirements set forth by the ITU-R IMT-2020 process. Further, the NR system should be able to use any spectrum band ranging at least up to 100 GHz that may be made available for wireless communications even in a more distant future.

The [SP-150149] foresaw the following timeline
 1) September 2015: RAN workshop
 2) September 2015: Initiation of the channel modelling work needed for the NR
 3) December 2015: Initiation of the RAN Study Item: scope & requirements for the NR
 4) March 2016: Initiation of the RAN WG SI: Identification and evaluation of solutions RAN #68 saw the first draft study item proposals for discussion for points 2) [RP-150781] and 3) [RP-150813], and further RAN #69 saw the first draft study item proposals for 4) in [RP-151278] and [RP-151551]. A study item on 2) [RP-151606] started in RAN #69.

This study item will address point 4) and build on the work done in the three preceding steps, discussions in the RAN workshop on NR, and the draft SIDs submitted to RAN #69.

The study aims to develop an NR access technology to meet a broad range of use cases including enhanced mobile broadband, massive MTC, critical MTC, and additional requirements defined during the RAN requirements study.

The new RAT will consider frequency ranges up to 100 GHz [TR38.913].

Figure 3:
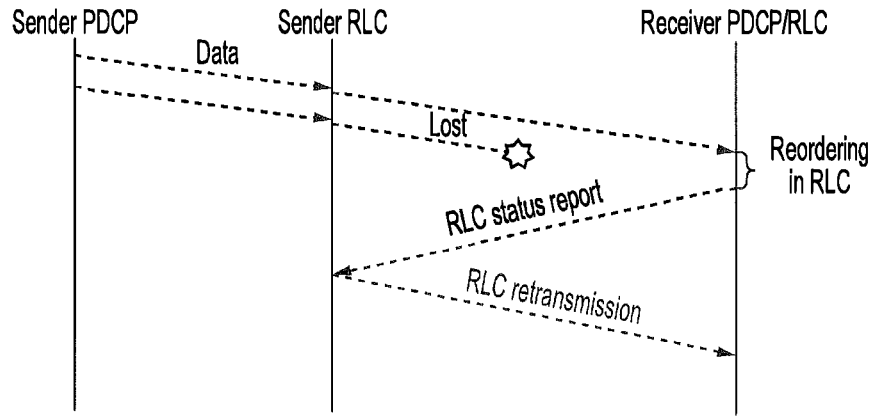
FIG. 3 depicts retransmission in the RLC layer.
Figure 4:
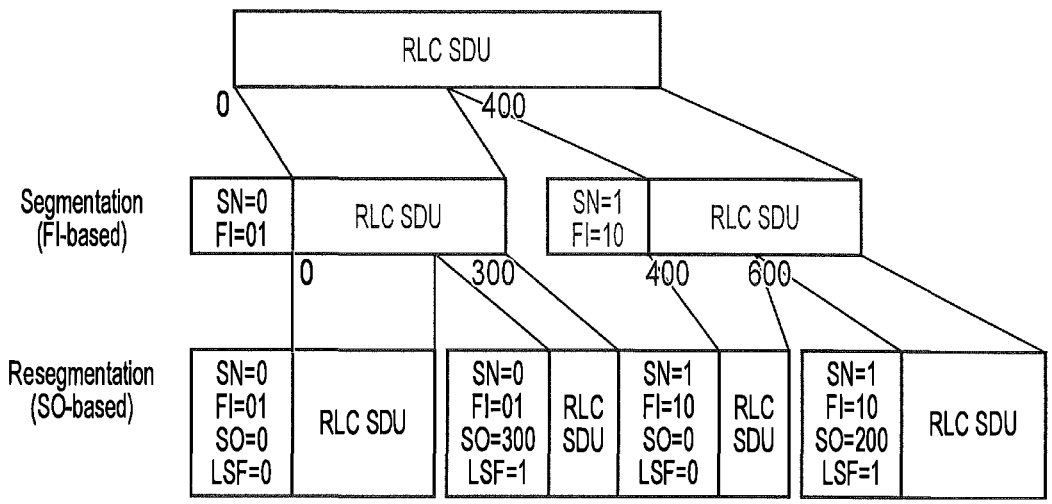
FIG. 4 illustrates an example of SO-based segmentation and resegmentation.

Detailed objectives of the study item are:
 (1) Target a single technical framework addressing all usage scenarios, requirements and deployment scenarios defined in TR38.913 including
  Enhanced mobile broadband
  Massive machine-type-communications
  Ultra reliable and low latency communications (2) The new RAT shall be inherently forward compatible
It is assumed that the normative specification would occur in two phases: Phase I (to be completed in June 2018) and Phase II (to be completed in December 2019)
Phase I specification of the new RAT must be forward compatible (in terms of efficient co-cell/site/carrier operation) with Phase II specification and beyond, and backward compatibility to LTE is not required
Phase II specification of the new RAT builds on the foundation of Phase I specification, and meets all the set requirements for the new RAT.
Smooth future evolution beyond Phase II needs to be ensured to support later advanced features and to enable support of service requirements identified later than Phase II specification.
(3) Initial work of the study item should allocate high priority on gaining a common understanding on what is required in terms of radio protocol structure and architecture to fulfil objective 1 and 2, with focus on progressing in the following areas
Fundamental physical layer signal structure for new RAT
Waveform based on OFDM, with potential support of non-orthogonal waveform and multiple access
FFS: other waveforms if they demonstrate justifiable gain
Basic frame structure(s)
Channel coding scheme(s)
Radio interface protocol architecture and procedures
Radio Access Network architecture, interface protocols and procedures,
Study on the above 2 bullets shall at least cover:
Study the feasibility of different options of splitting the architecture into a "central unit" and a "distributed unit", with potential interface in between, including transport, configuration and other required functional interactions between these nodes [RAN2, RAN3];
Study the alternative solutions with regard to signaling, orchestration, . . . , and OAM, where applicable [in co-operation with SA5];
Study and outline the RAN-NextGen Core Network interface and functional split [in co-operation with SA2] [RAN2, RAN3];
Note: RAN, in this context, refers to a radio access network that supports either Evolved E-UTRA or the new radio access technology or both, interfacing with the next generation core [TR 23.799]
Study and identify the basic structure and operation of realization of RAN Networks functions (NFs). Study to what extent it is feasible to standardize RAN NFs, the interfaces of RAN NFs and their interdependency [RAN3];
Study and identify specification impacts of enabling the realization of Network Slicing [in co-operation with SA2] [RAN2, RAN3];
Study and identify additional architecture requirements e.g. support for QoS concept, SON, support of sidelink for D2D [RAN1, RAN2, RAN3].
Fundamental RF aspects—especially where they may impact decisions on the above, e.g.,
Study and identify the aspects related to the testability of RF and performance requirements (4) Study and identify the technical features necessary to enable the new radio access to meet objective 1 and 2, also including:
Tight interworking between the new RAT and LTE
Interworking with non-3GPP systems
Operation in licensed bands (paired and unpaired), and licensed assisted operations in unlicensed bands [Standalone operation in unlicensed bands is FFS]
Efficient multiplexing of traffic for different services and use cases on the same contiguous block of spectrum
Stand alone operation in licensed bands
Note 1: The scope of Phase I will be determined when agreeing on Phase I WID(s).
Note 2: Stated KPI values and deployment scenarios to be aligned to scenarios and requirement SI outcome
(5) Provide performance evaluation of the technologies identified for the new RAT and analysis of the expected specification work
(6) Identify relevant RF parameters used to be used for sharing and co-existence studies
(7) Study and identify technical solutions that enable support for wireless relay" RAN2 meeting documents [4] to [10] discuss various aspects of the 5G NR system, which are summarised below.
User Plane
ARQ Functionality Location
The ARQ will be supported in RLC
RLC adds an RLC SN
(Packet Data Convergence Protocol (PDCP) SN based ARQ in RLC layer was ruled out)
Reordering
NR specification should not prohibit out-of-order deciphering of PDCP protocol data units (PDUs)
Complete PDCP PDUs can be delivered out-of-order from RLC to PDCP. RLC delivers PDCP PDUs to PDCP after the PDU is reassembled
PDCP reordering is always enabled if in sequence delivery to layers above PDCP is needed (i.e. even in non-DC case)
(i.e. RLC may deliver out of sequence (change compared to LTE))
FIG. 3 is taken from [7] and depicts retransmission in the RLC layer. RLC transmission could overcome the drawbacks of PDCP transmission in that no extra delay is incurred from the non-ideal link between sender PDCP and sender RLC during the retransmission process.
Concatenation
RAN2 should consider both the processing of transmitter and the receiver when evaluating whether to divert from the LTE-baseline
RAN2 aim to make a final decision at the next meeting
Proponents of solutions to next meeting must identify the what issues (e.g. easing implementation aspects, overhead, etc.) are being addressed by their proposals
Segmentation
In NR, the segmentation function is only placed in the RLC layer as in LTE
Segment offset (SO)-based segmentation can be considered for both segmentation and resegmentation as a baseline in NR user plane to support high data rate. (Does not imply anything about location of concatenation). At least overhead for the low data rate case should be analysed further
FIG. 4 is taken from [10], and illustrates an example of SO-based segmentation and resegmentation. The same size of segmented SDU with a previous LTE case (which is described in [10] with reference to FIG. 1 of [10]) is assumed in the example. FIG. 4 shows that it is possible for SO-based segmentation to perform the same level of segmentation of LTE. This means that segmentation and resegmentation can be unified by SO-based segmentation.

Figure 5:
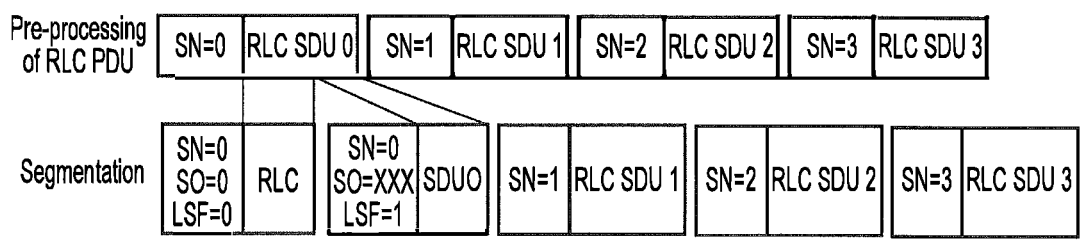
FIG. 5 illustrates an example of pre-processing of RLC PDUs and segmentation for segmentation offset (SO) based segmentation.

FIG. 5 is also taken from [10], and illustrates an example of pre-processing of RLC PDUs and segmentation for SO-based segmentation. In the example, 4 RLC PDUs are assumed to be constructed in advance. If the RLC PDU with SN=0 is segmented into 2 RLC PDUs, then in a framing info (FI)-based segmentation example (which is described in [10] with reference to FIG. 3 of [10]) requires an additional consecutive sequence number, i.e., SN=1. This means that the other pre-processed RLC PDUs should change their SNs, thus pre-processing of these PDUs becomes weaker. On the other hand, the SO-based segmentation as shown in FIG. 5 does not need to change sequence number of each pre-processed RLC PDU. Therefore, pre-processing of RLC PDUs for reducing real-time processing requires SO-based segmentation rather than FI-based segmentation.

Current RLC Model and User-Plane Protocol Architecture for LTE

Figure 6:
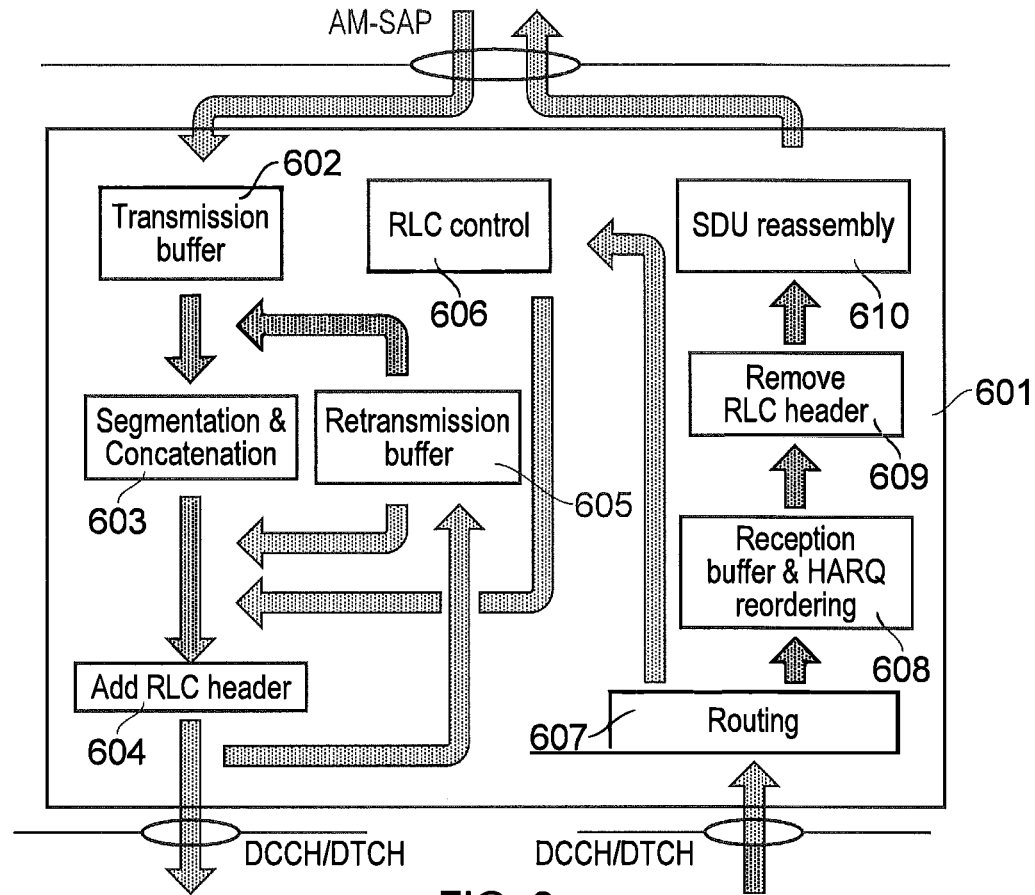
FIG. 6 shows a model of an acknowledged mode entity in accordance with the 3GPP LTE RLC specification.

FIG. 6 shows an acknowledged mode (AM) RLC entity 601, comprising a transmission buffer 602, segmentation and concatenation means 603, RLC header addition means 604, retransmission buffer 605, RLC control means 606, routing means 607, a reception buffer 608 which may carry out re-ordering in accordance with a HARQ protocol, RLC removal means 609 and SDU reassembly means 610. When a transmitting side of an AM RLC entity forms AMD PDUs from RLC SDUs, it shall segment and/or concatenate the RLC SDUs so that the AMD PDUs fit within the total size of RLC PDU(s) indicated by lower layer at the particular transmission opportunity notified by lower layer. The transmitting side of an AM RLC entity supports retransmission of RLC data PDUs (ARQ). If the RLC data PDU to be retransmitted does not fit within the total size of RLC PDU(s) indicated by lower layer at the particular transmission opportunity notified by lower layer, the AM RLC entity can re-segment the RLC data PDU into AMD PDU segments and the number of resegmentation is not limited. When the transmitting side of an AM RLC entity forms AMD PDUs from RLC SDUs received from upper layer or AMD PDU segments from RLC data PDUs to be retransmitted, it shall include relevant RLC headers in the RLC data PDU. When the receiving side of an AM RLC entity receives RLC data PDUs, it shall detect whether or not the RLC data PDUs have been received in duplication, and discard duplicated RLC data PDUs, reorder the RLC data PDUs if they are received out of sequence, detect the loss of RLC data PDUs at lower layers and request retransmissions to its peer AM RLC entity and reassemble RLC SDUs from the reordered RLC data PDUs and deliver the RLC SDUs to upper layer in sequence. At the time of RLC re-establishment, the receiving side of an AM RLC entity shall if possible, reassemble RLC SDUs from the RLC data PDUs that are received out of sequence and deliver them to upper layer, discard any remaining RLC data PDUs that could not be reassembled into RLC SDUs and initialise relevant state variables and stop relevant timers.

Figure 7:
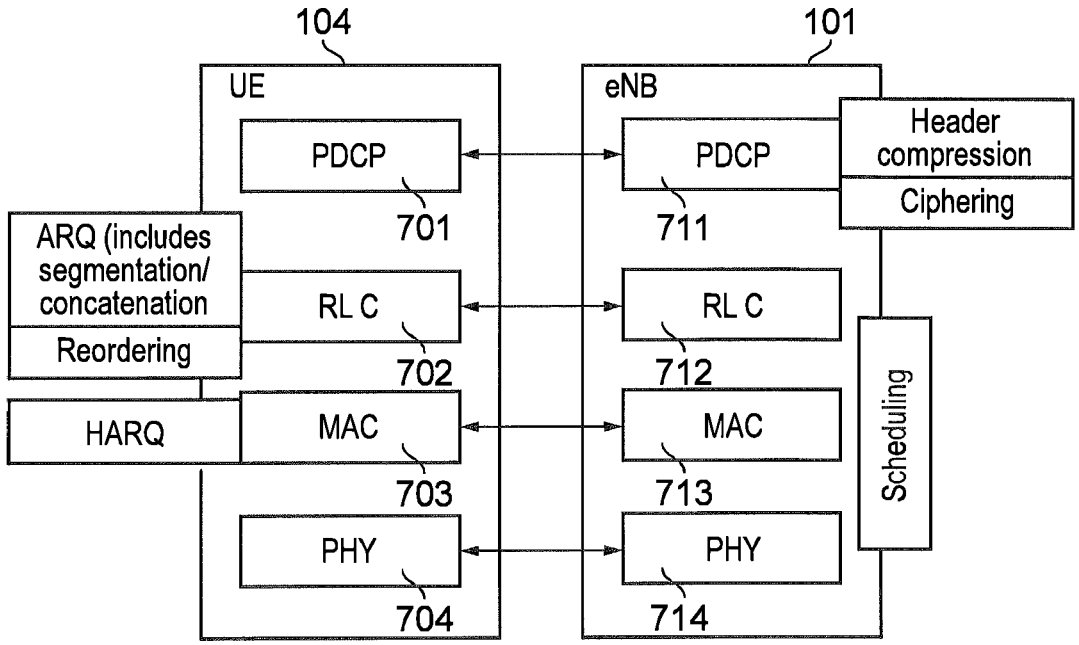
FIG. 7 displays diagrammatically the user-plane architecture for LTE systems.

The user-plane protocol architecture for LTE is shown in FIG. 7. Protocol architecture of a UE 104 comprises, at layer 2 of the protocol stack, a PDCP layer 701, an RLC layer 702 and a MAC layer 703, all above the physical layer 704 at layer 1 of the protocol stack. Likewise, protocol architecture of an eNodeB 101 comprises, at layer 2 of the protocol stack, a PDCP layer 711, an RLC layer 712 and a MAC layer 713, all above the physical layer 714 at layer 1 of the protocol stack. Data is able to be communicated between the PDCP layer 701 of the UE 104 and the PDCP layer 711 of the eNodeB 101, between the RLC layer 702 of the UE 104 and the RLC layer 712 of the eNodeB 101, between the MAC layer 703 of the UE 104 and the MAC layer 713 of the eNodeB 101 and between the physical layer 704 of the UE 104 and the physical layer 714 of the eNodeB 101.

RLC Polling and Status Reporting in 5G NR

Significantly, most of the optimisations proposed from UE and chipset vendors aim to simplify the overall user-plane protocol stack implementation, and in particular to reduce processing overhead—reducing the amount of processing the UE needs to do for each transmitted data packet. In addition, the removal of concatenation allows for pre-processing the RLC headers as well as optimizing the implementation by allowing some pre-processing of the data packets including ciphering, rather than having to do this in real time. If concatenation is not used, then there is no need to include additional length fields in the RLC header and the header can be a fixed size.

One of the aspects not yet discussed with regards to the 5G new RAT systems is that of RLC polling and status reporting. In LTE, RLC polling is specified as follows (from [11]).

An AM RLC entity can poll its peer AM RLC entity in order to trigger STATUS reporting at the peer AM RLC entity.

Upon assembly of a new AMD PDU, the transmitting side of an AM RLC entity shall:
    increment PDU_WITHOUT_POLL by one;
    increment BYTE_WITHOUT_POLL by every new byte
        of Data field element that it maps to the Data field of the
        RLC data PDU;
    if PDU_WITHOUT_POLL>=pollPDU; or
    if BYTE_WITHOUT_POLL>=pollByte;
        include a poll in the RLC data PDU as described below.

Upon assembly of an AMD PDU or AMD PDU segment, the transmitting side of an AM RLC entity shall:
    if both the transmission buffer and the retransmission
        buffer becomes empty (excluding transmitted RLC data
        PDU awaiting for acknowledgements) after the transmission of the RLC data PDU; or
    if no new RLC data PDU can be transmitted after the
        transmission of the RLC data PDU (e.g. due to window
        stalling);
        include a poll in the RLC data PDU as described below.

To include a poll in a RLC data PDU, the transmitting side of an AM RLC entity shall:
    set the P field of the RLC data PDU to "1";
    set PDU_WITHOUT_POLL to 0;
    set BYTE_WITHOUT_POLL to 0;

After delivering a RLC data PDU including a poll to lower layer and after incrementing of VT(S) if necessary, the transmitting side of an AM RLC entity shall:
    set POLL_SN to VT(S)−1;
    if t-PollRetransmit is not running:
        start t-PollRetransmit;
    else:
        restart t-PollRetransmit;

In summary, the UE RLC entity maintains 2 counters. One counter counts transmitted RLC PDUs, and the other counts transmitted bytes. If either count reaches the configured threshold, a poll is sent (requesting ACK/NACK in a status report) and the counters are reset.

If the UE does not receive a response to the poll within the t-PollRetransmit then the PDU containing the poll is resent (Assumed to be not received).

The main purpose of the polling mechanism is to advance the transmission window, which avoids protocol stalling. Errors are typically corrected at HARQ, with any leftover errors detected by the receiving RLC entity using the reordering timer. The polling mechanism confirms the last acknowledged sequence number so that the window can be advanced so to accept new data from upper layers. The reason for maintaining 2 counters is to account for variable PDU size. In case of good radio conditions, the PDU size is large and so memory would be the limitation (UE can reserve a fixed amount of memory to store/buffer data). In case of poor radio conditions, the PDU size is small, so the RLC sequence number is the limitation. If the poll is sent after more than half of the SN range, then there is a risk of protocol stalling.

In UMTS a similar mechanism exists "Every Poll_SDU SDU.", whereby the UE counts the number of transmitted PDUs—however, both transmissions and retransmissions are counted, so UE has to calculate in every TTI whether to set a poll bit. The various UMTS polling triggers are shown below (from 25.322)

1) Last PDU in buffer.
   When an AMD PDU to be transmitted for the first time is submitted to lower layer, the Sender shall:
     if the AMD PDU is the last AMD PDU scheduled for transmission according to subclause 11.3.2 (i.e. no data received from upper layer remains to be segmented into AMD PDUs); or
     if the AMD PDU is the last AMD PDU that is allowed to transmit according to subclause 11.3.2.2:
        trigger a poll for this AMD PDU.

2) Last PDU in Retransmission buffer.
   When a retransmitted AMD PDU is submitted to lower layer, the Sender shall:
     if the AMD PDU is the last AMD PDU scheduled for retransmission according to subclause 11.3.2; or
     if the AMD PDU is the last of the AMD PDUs scheduled for retransmission that are allowed to transmit according to subclause 11.3.2.2:
        trigger a poll for this AMD PDU.

3) Poll timer.
   The timer Timer_Poll is started and stopped according to subclause 9.5 a). When the timer Timer_Poll expires the Sender triggers the Polling function.

4) Every Poll_PDU PDU.
   The Sender triggers the Polling function for every Poll_PDU PDU. Both retransmitted and new AMD PDUs shall be counted.

5) Every Poll_SDU SDU.
   The Sender triggers the Polling function for every Poll_SDU SDU. The poll shall be triggered for the first transmission of the AMD PDU that contains the last segment of an RLC SDU (indicated either by the "Length Indicator" indicating the end of the SDU or by the special value of the HE field).

6) Window based.
   The Sender triggers the Polling function when the condition described in subclause 9.6 d) ("Poll_Window") is fulfilled.

7) Timer based.
   The Sender triggers the Polling function periodically.

Fixed RLC Sequence Number Polling for New Radio

According to embodiments of the present technique, polling is based on the sequence number rather than the number of PDUs which have been transmitted. This means that the poll bit is always sent in a fixed SN, so can be included in the UE pre-generated RLC headers rather than having to determine in real-time. No counters are used. It has previously been proposed in a 3GPP document [12] that PDCP sequence numbers could be used for performing RLC ARQ. However, there is no disclosure in this document that the PDCP sequence numbers could be used for setting the poll bit (which may be managed by either RLC or PDCP), nor that the sequence numbers themselves could be used as a basis for the receiver of the PDUs to trigger a status report message to the transmitter.

Figure 8:
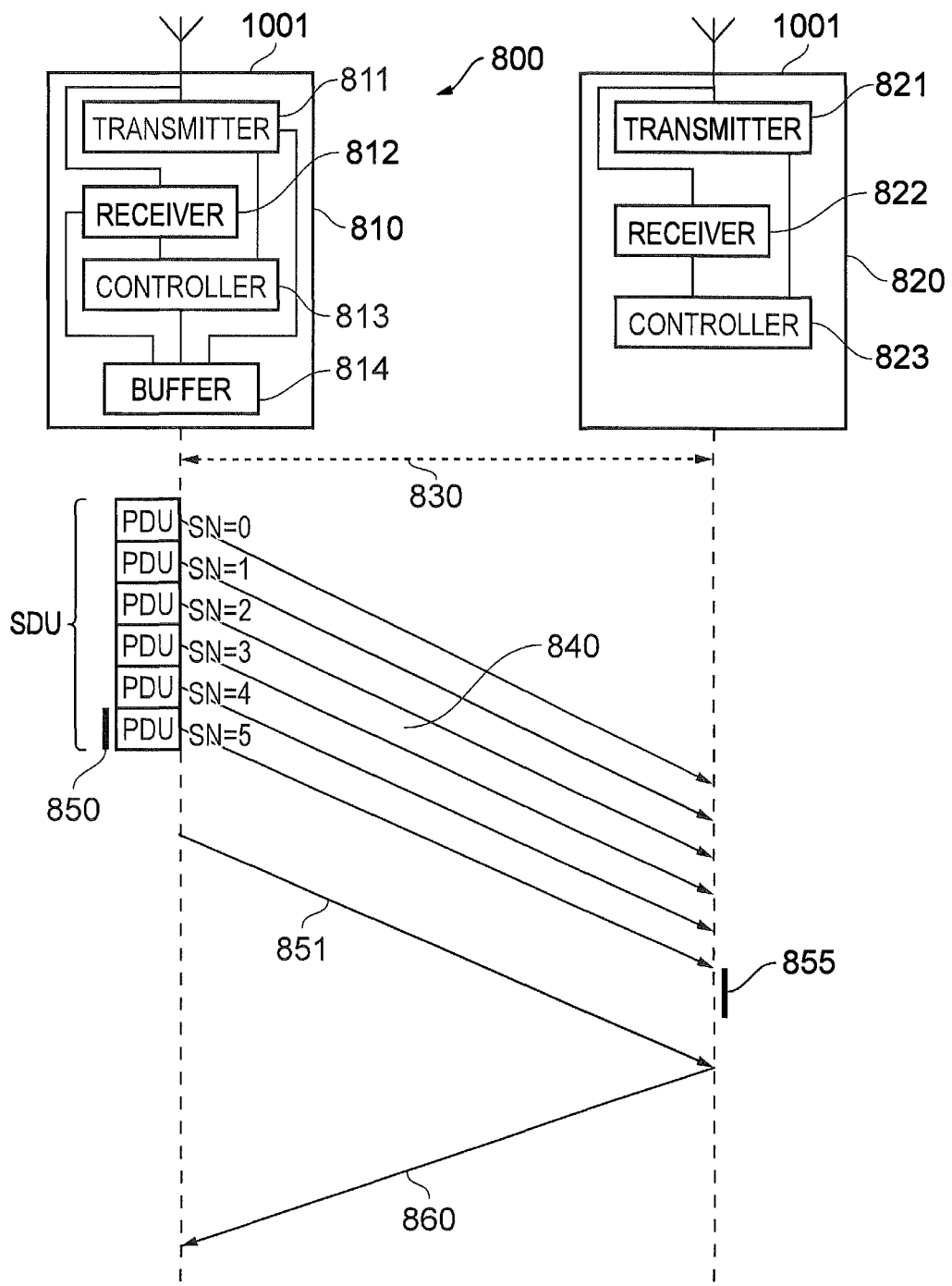
FIG. 8 is a part schematic representation, part message flow diagram of communications between a transmitting node and a receiving node of a mobile communications system in accordance with embodiments of the present technique.

FIG. 8 is a part schematic representation, part message flow diagram of communications between a transmitting node 810 and a receiving node 820 of a mobile communications system 800 in accordance with embodiments of the present technique.

The transmitting node 810 comprises transmitter circuitry 811 configured to transmit 840 signals representing protocol data units formed from one or more service data units via a wireless access interface 830 of the mobile communications system 800 to the receiving node 820 of the mobile communications system 800 according to an automatic repeat request process, receiver circuitry 812 configured to receive signals from the receiving node 820 via the wireless access interface 830, controller circuitry 813 configured to control the transmitter circuitry 811 to transmit the signals and to control the receiver circuitry 812 to receive the signals, and a buffer 814 configured to store data conveyed by or representing the protocol data units for transmission to the receiving node 820 according to the automatic repeat request process. Each of the protocol data units, as can be seen in FIG. 8, has a sequence number defining its position in a predetermined order.

The receiving node 820 comprises receiver circuitry 822 configured to receive 840 the signals representing protocol data units formed from one or more service data units via the wireless access interface 830 of the mobile communications system 800 from the transmitting node 810 of the mobile communications system 800 according to the automatic repeat request process, transmitter circuitry 821 configured to transmit signals to the transmitting node 810 via the wireless access interface 830, and controller circuitry 823 configured to control the transmitter circuitry 821 to transmit the signals and to control the receiver circuitry 822 to receive the signals.

In some embodiments of the present technique, the controller circuitry 813 of the transmitting node 810 is configured in combination with the transmitter circuitry 811 and the buffer 814 of the transmitting node 810 to detect 850, based on the sequence number of one or more of the protocol data units, whether predetermined criteria are satisfied, and in response, to transmit 851 a polling bit to the receiving node 820 in the one or more of the protocol data units for which the sequence number satisfies the predetermined criteria. The controller circuitry 813 may then be configured in combination with the transmitter circuitry 811, the receiver circuitry 812 and the buffer 814 to receive 860, from the receiving node 820, in response to the polling bit, a status report message comprising a negative acknowledgement for one or more protocol data units which were not successfully received by the receiving node 820, and to re-transmit to the receiving node 820 the one or more protocol data units which were not successfully received by the receiving node 820.

In some embodiments of the present technique, the controller circuitry 823 of the receiving node 820 is configured in combination with the receiver 822 of the receiving node 820 to detect 855, based on the sequence number of one or more of the protocol data units, whether predetermined criteria are satisfied, and in response to transmit 860 a status report message comprising a negative acknowledgement for one or more protocol data units which were not successfully received. The status report message may be transmitted 860 on the basis of the detection 855 of the sequence numbers alone or alternatively in response to the reception 851 of a polling bit from the transmitting node 810. The receiving node 820 may then, in some embodiments of the present technique, be configured to receive from the transmitting node 810 as a re-transmission, in response to the status report message, the one or more protocol data units which were not successfully received from the transmitting node 810.

In some embodiments of the present technique, the buffer 814 comprises a sliding window which represents protocol data units which have been transmitted by the transmitting node 810 but not yet successfully acknowledged by the receiving node 820, an upper edge of the sliding window being set to a first value equal to a sequence number to be assigned for a next newly generated protocol data unit at the transmitting node 810 and a lower edge of the sliding window being set to a second value equal to a sequence number of a next protocol data unit for which a successful acknowledgement is to be received from the receiving node 820 in the predetermined order, and the controller circuitry 813 is configured in combination with the transmitter circuitry 811, the receiver circuitry 812 and the buffer 813 to receive from the receiving node an indication that one or more of the protocol data units have not been successfully received by the receiving node 820, to re-transmit from the buffer 814 the one or more of the protocol data units which have not been successfully received by the receiving node 820, and to advance the sliding window according to the second value, such that memory of the buffer 814 is freed at locations at which are stored each of the protocol data units in the predetermined order which have been successfully received before the one or more protocol data units which have not been successfully received.

Of course, it may be the case that the PDUs up to a particular sequence number, for example PDUs up to and including the PDU containing the polling bit, or the PDUs up to and including the PDU with a sequence number satisfying the predetermined criteria. For example, PDUs with SN=1, 2, 3, 4, 5 may be transmitted, where SN=5 satisfies the predetermined criteria. If all five of those PDUs have been successfully received, the sliding window can advance according to the SN value of 5. Alternatively, a number of PDUs up to any other PDU up to the PDU containing the poll bit or satisfying the predetermined criteria may all be successfully received. The status report may contain an indication of the last successfully received SN in order and may contain indications of the SNs of any PDUs which have not successfully been received. For example, again, PDUs with SN=1, 2, 3, 4, 5 may be transmitted, where SN=5 satisfies the predetermined criteria. However, if the PDU with an SN=4 is not successfully received by the receiver, then the sliding window can advance according to the SN value of 3, freeing space at the three locations where PDUs with SN=1, 2, 3 were stored, whilst the PDU with SN=4 requires a re-transmission. In both of the above cases, in some embodiments of the present technique, the sliding window of the buffer can be advanced to free the memory of the buffer at locations at which are stored each of those PDUs which were successfully received in sequence number order, as no re-transmissions for any of those PDUs are therefore required.

In other words, in some embodiments of the present technique, the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer to receive from the receiving node an indication that all of the protocol data units up to and including the protocol data unit having a sequence number equal to the second value, and to advance the sliding window according to the second value, such that memory of the buffer is freed at locations at which are stored each of the protocol data units in the predetermined order which have been successfully received before the one or more protocol data units which have not been successfully received.

The main advantage of using a fixed SN is that it is no longer necessary to maintain any counters, which involve some processing overhead to manage. The RLC headers can be hard-coded with a poll bit in certain SNs. In other words, the protocol data units each include a header which is at least partly pre-generated to include the sequence number of the each of the protocol data units.

The fixed SN could be fixed in the specification (e.g. on SN=0 and SN=half of the maximum SN) or it might be configurable by the network (e.g. poll every SN mod N). In other words, the predetermined criteria comprises the sequence number of the one or more of the protocol data units being equal to one of one or more predetermined values of sequence numbers, the one or more predetermined values of sequence numbers being known by the transmitting device and the receiving device, or wherein the predetermined criteria comprises the sequence number of the one or more of the protocol data units being equal to one of one or more values of sequence numbers configured by the mobile communications system and provided to the transmitting node and the receiving node. In some embodiments of the present technique, the predetermined criteria comprises the sequence number of the one or more of the protocol data units being greater than or equal to one of one or more predetermined values of sequence numbers, the one or more predetermined values of sequence numbers being known by the transmitting device and the receiving device, or wherein the predetermined criteria comprises the sequence number of the one or more of the protocol data units being greater than or equal one of one or more values of sequence numbers configured by the mobile communications system and provided to the transmitting node and the receiving node—these embodiments include those in which polling bits are not used, or a polling bit is not successfully received by the receiving node, which then triggers the sending of a status report message when a higher SN than expected is received.

Figure 9:
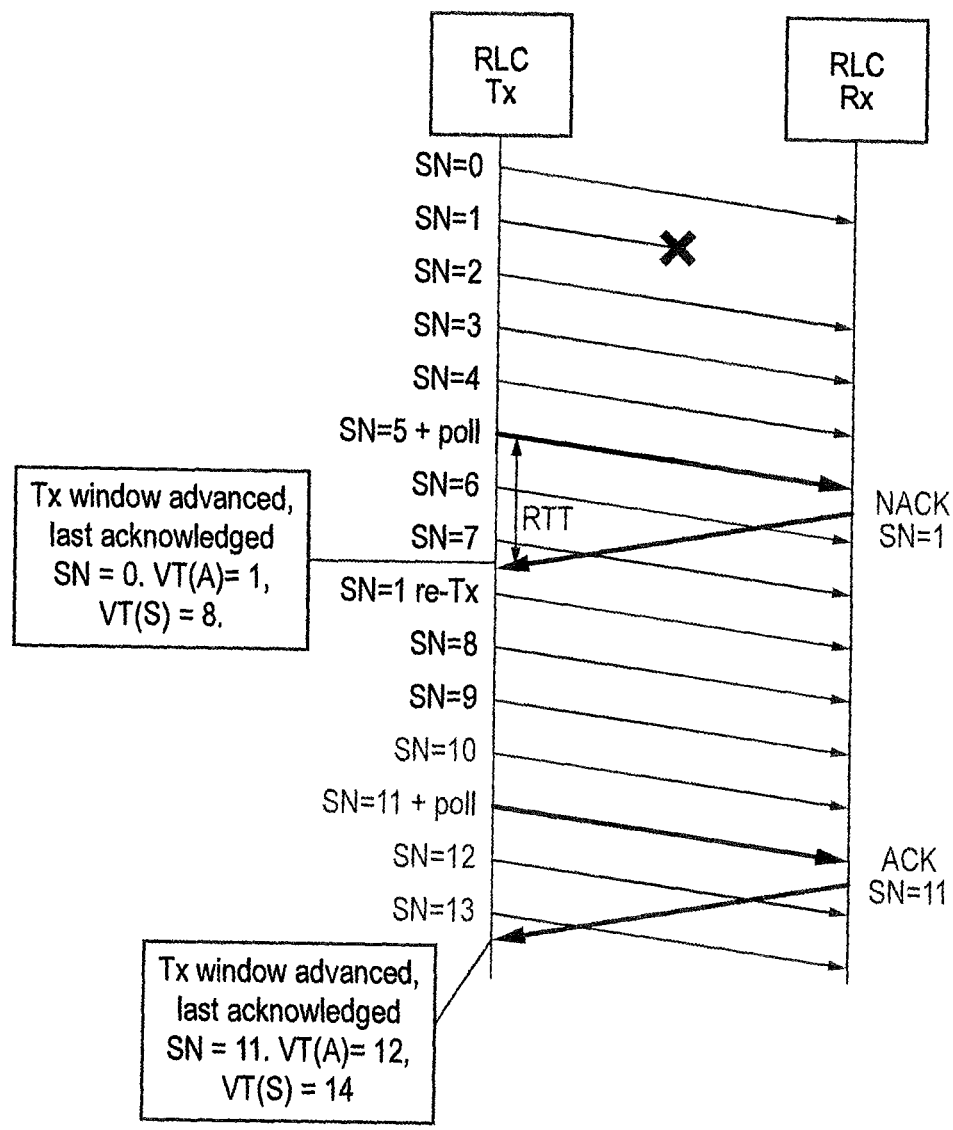
FIG. 9 illustrates an example of polling based on sequence numbers in accordance with embodiments of the present technique.

An example of basic polling operation and transmitter window state variables in accordance with the present technique is shown in FIG. 9. The fixed SN is always known to both the transmitter and the receiver. Due to this, the receiver can proactively send a status report if it receives any PDU with a higher sequence number than the fixed polling SN. This is particularly useful in case the PDU containing a poll bit is received out of order, or has been lost on the radio link and needs to be retransmitted. It allows the receiver to trigger a status report more quickly, and so any PDUs for which a NACK is transmitted by the receiving node can be retransmitted more quickly by the transmitting node, improving the overall performance as well as the processing benefit at the transmitter.

Figure 10:
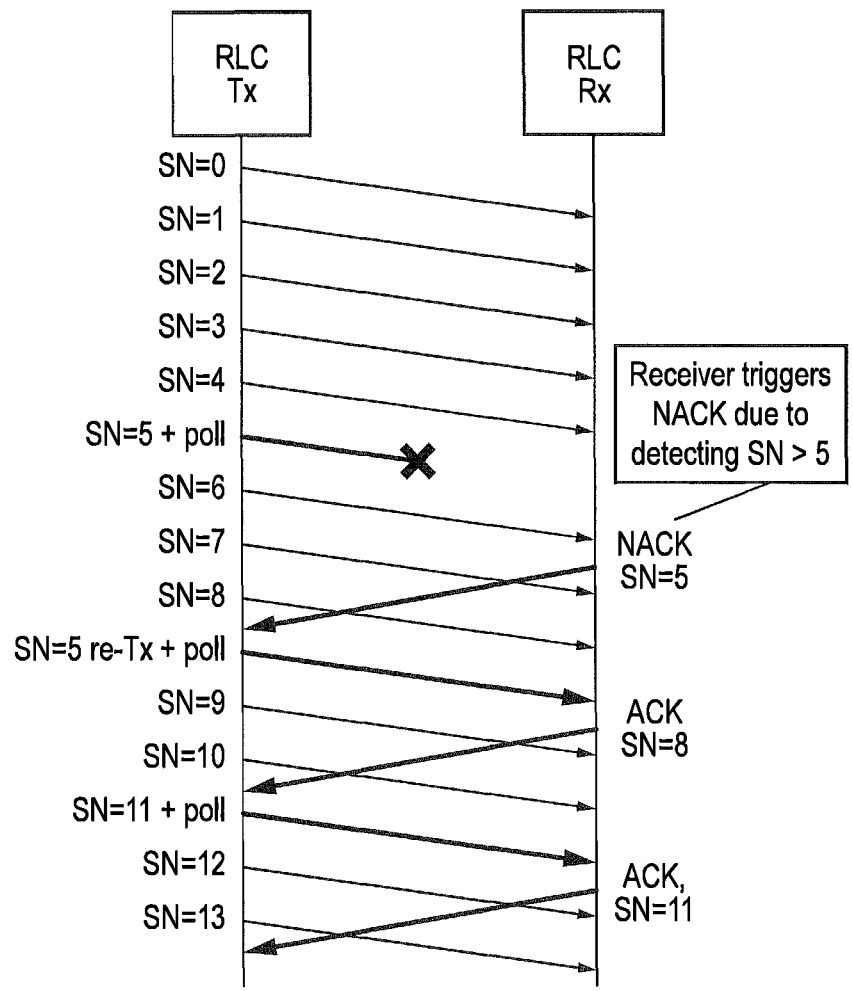
FIG. 10 illustrates an example of transmitting negative acknowledgements (NACKs) by the receiving device automatically based on the sequence number in accordance with embodiments of the present technique.

FIG. 10 shows an example of transmitting negative acknowledgements (NACKs) by the receiving device automatically based on the sequence number in accordance with embodiments of the present technique. As can be seen, in case the receiver detects SN>N, a status report is automatically generated. This allows recovery of the error and advancing the window more quickly. The drawback of this approach is a slightly increased overhead due to the additional STATUS report—therefore it's possible such behaviour is configurable, so that the network can choose the operation it prefers (faster error recovery, or less overhead). Another alternative is to remove the poll bit in case of retransmission.

It is expected that the UE has to be able to include poll bits under some other conditions too. For example, a poll bit should be included when the buffer becomes empty, in order to trigger a status report for acknowledgement of all of the data. For example, PDUs with SN=1, 2, 3, 4 may be transmitted. In this case, the buffer still contains all four of these PDUs, but since the PDU with SN=4 is the last one being transmitted from the buffer, a poll bit is set. The final PDU might alternatively be a re-transmission. For example, if PDUs with SN=1, 2, 3, 4 are transmitted, and then a NACK is received for the PDU with for SN=2, this PDU is re-transmitted following the transmissions of the PDUs with SN=3 and 4 (and the reception of the NACK for the PDU with SN=2, whether in a status report message or otherwise) and a poll bit is sent with the re-transmitted PDU with SN=2, as it is the last one in the buffer to be sent. In other words, the transmitting node is configured to detect that the next of the protocol data units to be transmitted is the last protocol data unit in the buffer, and to transmit a polling bit to the receiving node along with the next of the protocol data units to be transmitted.

In addition, it might also be necessary to maintain a byte counter, in case of any memory limitation. The fixed SN polling might also work in parallel with the PDU count, however this partly reduces the benefit of being able to avoid processing overhead—the SN based polling should be enough for managing the transmit window in a very simple manner. In other words, the transmitting node is configured to detect that the number of protocol units or the number of bytes stored in the buffer exceeds a predetermined threshold, and in response to transmit a polling bit to the receiving node along with the next of the protocol data units to be transmitted.

It is also expected the receiver can trigger a status report in case it detects an error. The LTE mechanism uses a reordering timer, however it might also be considered that a status report can be triggered in case a missing RLC SN is detected, at current SN−N. In other words, the receiving node is configured to detect that a received protocol data unit has a sequence number which is received out of an expected order corresponding to the order of the sequence numbers, and in response to transmit to the transmitting node a status report comprising a negative acknowledgement for a protocol data units having the expected sequence number to match the predetermined criteria, and to receive from the transmitting node as a re-transmission a polling bit and the protocol data unit having the expected number to match the predetermined criteria. In some embodiments of the present technique, receiving a small number of PDUs out of order is tolerated by the receiving node, to compensate for HARQ retransmissions of PDUs which were not successfully received during their first transmissions. However, a gap in reception of PDUs may be detected by the receiving node, which would receive nothing at a time when it would be expecting to receive a PDU with a particular SN.

Figure 11:
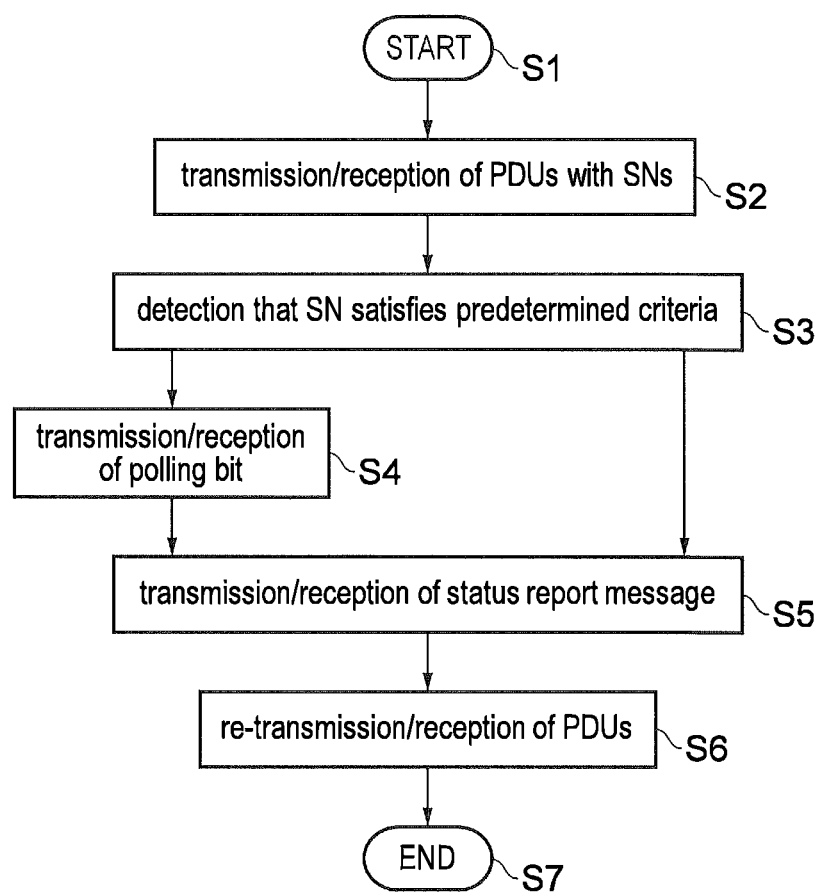
FIG. 11 shows a flow diagram illustrating a method of communications between a transmitting node and a receiving node of a mobile communications system in accordance with embodiments of the present technique.

FIG. 11 shows a flow diagram illustrating a method of communications between a transmitting node and a receiving node of a mobile communications system in accordance with embodiments of the present technique. The process begins in step S1. The method comprises, in step S2, the transmission of by the transmitting node and reception of by the receiving node signals representing protocol data units formed from one or more service units via a wireless access interface of the mobile communications system according to an automatic repeat request process, wherein each of the protocol data units has a sequence number defining their position in a predetermined order—these protocol data units are stored in a buffer at the transmitting node once they have been transmitted to the receiving node. The method then comprises in step S3, detecting, based on the sequence number of one or more of the protocol data units, the predetermined criteria are satisfied. In some embodiments of the present technique, the process advances to step S4, which comprises the transmission of by the transmitting node and reception of by the receiving node a polling bit. Dependent on either the transmitted/received polling bit or the sequence numbers of received protocol data units, in step S5, the method comprises the transmission of by the receiving node and reception of by the transmitting node a status report message comprising a negative acknowledgement for one or more protocol data units which were not successfully received by the receiving node. In some embodiments of the present technique, the process then advances to step S6, which comprises the re-transmitting of by the transmitting node and reception of by the receiving node the PDUs for which the negative acknowledgements were transmitted by the receiving node in the status report message. The process ends in step S7.

In embodiments of the present technique, the receiving node forms part of a mobile communications network and may, for example, be an infrastructure equipment (base station/eNodeB etc.) The transmitting node may, for example, be a communications device, or user equipment (UE).

In embodiments of the present disclosure, the transmitter circuitry 811, 821 may include analogue and digital circuitry such as radio frequency circuits and filters, analogue amplifiers as well as digital signalling processing software implemented as application specific semiconductor circuits, dedicated signalling processing logic and other processors. Similarly the receiver circuitry 812, 822 may include radio frequency circuitry and filters, signal processing software in the form of digital signal processors and other devices for detecting signals. The controller circuitry 813, 823 may be formed from processors executing software, application specific semiconductor circuits or hardware circuits comprising digital logic. In some examples the controller circuitry 823 of the receiving node 820 can include a so-called "scheduler" which schedules the transmission of signals and the reception of signals via the wireless access interface.

Advantages of embodiments of the present technique include the simplification of RLC polling. Pre-configuration of RLC headers is enabled, which reduces processing overheads especially at a high data throughput. Furthermore, embodiments of the present technique allow the receiver to automatically respond without re-transmission of PDUs containing poll bits, allowing for faster re-transmission and improved overall performance.

The following numbered paragraphs provide further example aspects and features of the present technique:

Paragraph 1. A transmitting node operating with a mobile communications system comprising transmitter circuitry configured to transmit signals representing protocol data units formed from one or more service data units via a wireless access interface of the mobile communications system to a receiving node of the mobile communications system according to an automatic repeat request process, receiver circuitry configured to receive signals from the receiving node via the wireless access interface, controller circuitry configured to control the transmitter circuitry to transmit the signals and to control the receiver circuitry to receive the signals, and a buffer configured to store data conveyed by or representing the protocol data units for transmission to the receiving node according to the automatic repeat request process, wherein each of the protocol data units has a sequence number defining their position in a predetermined order, and the controller circuitry is configured in combination with the transmitter circuitry and the buffer to detect, based on the sequence number of one or more of the protocol data units, whether predetermined criteria are satisfied, and in response to transmit a polling bit to the receiving node in the one or more of the protocol data units for which the sequence number satisfies the predetermined criteria.

Paragraph 2. A transmitting node according to Paragraph 1, wherein the protocol data units each include a header which is at least partly pre-generated to include the sequence number of the each of the protocol data units.

Paragraph 3. A transmitting node according to Paragraph 1 or Paragraph 2, wherein the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer to receive from the receiving node an indication that one or more of the protocol data units have not been successfully received by the receiving node, to re-transmit from the buffer the one or more of the protocol data units which have not been successfully received by the receiving node, and to advance the sliding window according to the second value, such that memory of the buffer is freed at locations at which are stored each of the protocol data units in the predetermined order which have been successfully received before the one or more protocol data units which have not been successfully received.

Paragraph 4. A transmitting node according to Paragraph 1 or Paragraph 2, wherein the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer to receive from the receiving node an indication that all of the protocol data units up to and including the protocol data unit having a sequence number equal to the second value, and to advance the sliding window according to the second value, such that memory of the buffer is freed at locations at which are stored each of the protocol data units in the predetermined order which have been successfully received before the one or more protocol data units which have not been successfully received.

Paragraph 5. A transmitting node according to any of Paragraphs 1 to 4, wherein the predetermined criteria comprises the sequence number of the one or more of the protocol data units being equal to one of one or more predetermined values of sequence numbers, the one or more predetermined values of sequence numbers being known by the transmitting device and the receiving device.

Paragraph 6. A transmitting node according to any of Paragraphs 1 to 4, wherein the predetermined criteria comprises the sequence number of the one or more of the protocol data units being equal to one of one or more values of sequence numbers configured by the mobile communications system and provided to the transmitting node and the receiving node.

Paragraph 7. A transmitting node according to any of Paragraphs 1 to 6, wherein the controller circuitry is configured in combination with the transmitter circuitry, the receiver circuitry and the buffer to receive from the receiving node, in response to the polling bit, a status report comprising a negative acknowledgement for one or more protocol data units which were not successfully received by the receiving node, and to re-transmit to the receiving node the one or more protocol data units which were not successfully received by the receiving node.

Paragraph 8. A transmitting node according to any of Paragraphs 1 to 7, wherein the controller circuitry is configured in combination with the transmitter circuitry and the buffer to detect that the next of the protocol data units to be transmitted is the last protocol data unit being transmitted from the buffer, and to transmit a polling bit to the receiving node along with the next of the protocol data units to be transmitted.

Paragraph 9. A transmitting node according to any of Paragraphs 1 to 7, wherein the controller circuitry is configured in combination with the transmitter circuitry and the buffer to detect that the number of protocol units or the number of bytes stored in the buffer exceeds a predetermined threshold, and in response to transmit a polling bit to the receiving node along with the next of the protocol data units to be transmitted.

Paragraph 10. A receiving node operating with a mobile communications system comprising receiver circuitry configured to receive signals representing protocol data units formed from one or more service data units via a wireless access interface of the mobile communications system from a transmitting node of the mobile communications system according to an automatic repeat request process, transmitter circuitry configured to transmit signals to the transmitting node via the wireless access interface, and controller circuitry configured to control the transmitter circuitry to transmit the signals and to control the receiver circuitry to receive the signals, wherein each of the protocol data units has a sequence number defining their position in a predetermined order, and wherein the controller circuitry is configured in combination with the receiver circuitry to detect based on the sequence number of one or more of the protocol data units, that predetermined criteria are satisfied, and in response to transmit a status report message comprising a negative acknowledgement for one or more protocol data units which were not successfully received.

Paragraph 11. A receiving node according to Paragraph 10, wherein the controller is configured in combination with the receiver to receive a polling bit from the transmitting node along with each of the one or more of the protocol data units for which the predetermined criteria are satisfied.

Paragraph 12. A transmitting node according to Paragraph 10 or Paragraph 11, wherein the protocol data units each include a header which is at least partly pre-generated to include the sequence number of the each of the protocol data units.

Paragraph 13. A receiving node according to any of Paragraphs 10 to 12, wherein the predetermined criteria comprises the sequence number of the one or more of the protocol data units being greater than or equal to one of one or more predetermined values of sequence numbers, the one or more predetermined values of sequence numbers being known by the transmitting device and the receiving device.

Paragraph 14. A receiving node according to any of Paragraphs 10 to 12, wherein the predetermined criteria comprises the sequence number of the one or more of the protocol data units being greater than or equal to one of one or more values of sequence numbers configured by the mobile communications system and provided to the transmitting node and the receiving node.

Paragraph 15. A receiving node according to any of Paragraphs 10 to 14, wherein the controller circuitry is configured in combination with the transmitter circuitry and the receiver circuitry to receive from the transmitting node as a re-transmission, in response to the status report, the one or more protocol data units which were not successfully received from the transmitting node.

Paragraph 16. A receiving node according to any of Paragraphs 10 to 15, wherein the controller circuitry is configured in combination with the transmitter circuitry and the receiver circuitry to detect that a received protocol data unit has a sequence number which is received out of an expected order corresponding to the order of the sequence numbers, and in response to transmit to the transmitting node a status report comprising a negative acknowledgement for a protocol data units having the expected sequence number to match the predetermined criteria, and to receive from the transmitting node as a re-transmission a polling bit and the protocol data unit having the expected number to match the predetermined criteria Paragraph 17. A method of controlling communications at a transmitting node operating with a mobile communications system, the method comprising transmitting signals representing protocol data units formed from one or more service units via a wireless access interface of the mobile communications system to a receiving node of the mobile communications system according to an automatic repeat request process, wherein each of the protocol data units has a sequence number defining their position in a predetermined order, storing data conveyed by or representing the protocol data units transmitted to the receiving node according to the repeat request process in a buffer, detecting based on the sequence number of one or more of the protocol data units, the predetermined criteria are satisfied, and in response transmitting a polling bit to the receiving node in the one or more of the protocol data units for which the sequence number satisfies the predetermined criteria.

Paragraph 18. A method of controlling communications at a receiving node operating with a mobile communications system, the method comprising receiving signals representing protocol data units formed from one or more service data units via a wireless access interface of the mobile communications system from a transmitting node of the mobile communications system according to an automatic repeat request process, wherein each of the protocol data units has a sequence number defining their position in a predetermined order, detecting detect based on the sequence number of one or more of the protocol data units, that predetermined criteria are satisfied, and in response transmitting a status report message comprising a negative acknowledgement for one or more protocol data units which were not successfully received.

Paragraph 19. A method according to Paragraph 18, comprising receiving a polling bit from the transmitting node along with each of the one or more of the protocol data units for which the predetermined criteria are satisfied.

Paragraph 20. Circuitry for a transmitting node operating with a mobile communications system comprising transmitter circuitry configured to transmit signals representing protocol data units formed from one or more service data units via a wireless access interface of the mobile communications system to a receiving node of the mobile communications system according to an automatic repeat request process, receiver circuitry configured to receive signals from the receiving node via the wireless access interface, controller circuitry configured to control the transmitter circuitry to transmit the signals and to control the receiver circuitry to receive the signals, and a buffer configured to store data conveyed by or representing the protocol data units for transmission to the receiving node according to the automatic repeat request process, wherein each of the protocol data units has a sequence number defining their position in a predetermined order, and wherein the controller circuitry is configured in combination with the transmitter circuitry and the buffer to detect based on the sequence number of one or more of the protocol data units, the predetermined criteria are satisfied, and in response to transmit a polling bit to the receiving node in the one or more of the protocol data units for which the sequence number satisfies the predetermined criteria.

Paragraph 21. Circuitry for a receiving node operating with a mobile communications system comprising receiver circuitry configured to receive signals representing protocol data units formed from one or more service data units via a wireless access interface of the mobile communications system from a transmitting node of the mobile communications system according to an automatic repeat request process, transmitter circuitry configured to transmit signals to the transmitting node via the wireless access interface, and controller circuitry configured to control the transmitter circuitry to transmit the signals and to control the receiver circuitry to receive the signals, wherein each of the protocol data units has a sequence number defining their position in a predetermined order, and wherein the controller circuitry is configured in combination with the receiver circuitry to detect based on the sequence number of one or more of the protocol data units, that predetermined criteria are satisfied, and in response to transmit a status report message comprising a negative acknowledgement for one or more protocol data units which were not successfully received.

Paragraph 22. A mobile communications system comprising a transmitting node according to Paragraph 1 and a receiving node according to Paragraph 10.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] R2-166398, "Introduction of mobility enhancement UE capabilities." Huawei et al.
[3] RP-161596, "Study on New Radio (NR) Access Technology," 3GPP.
[4] R2-167143, "Way forward on U-plane modifications to LTE baseline," Qualcomm et al.
[5] R2-166828, "Second level retransmissions in NR," Ericsson.
[6] R2-166883, "Report of email discussion: [95# 27][LTE/NR] Reordering," Intel.
[7] R2-166195, "L2 Reordering and Retransmission Functions," Huawei et al.
[8] R2-167199, "On concatenation in NR," Samsung et al.
[9] R2-166488, "Considerations on the segmentation function in NR," Fujitsu.
[10] R2-166511, "Segment Offset-based Segmentation for NR," Samsung.
[11] TS 36.322, "Evolved Universal Terrestrial Radio Access (E-UTRA); Radio Link Control (RLC) protocol specification," 3GPP.
[12] R2-166159, "On usage of PDCP SN at RLC for NR," Nokia et al.

The invention claimed is:

1. Circuitry for a transmitting node operating with a mobile communications system comprising:

transmitter circuitry configured to transmit signals representing protocol data units formed from one or more service data units via a wireless access interface of the mobile communications system to a receiving node of the mobile communications system according to an automatic repeat request process, receiver circuitry configured to receive signals from the receiving node via the wireless access interface, controller circuitry configured to control the transmitter circuitry to transmit the signals and to control the receiver circuitry to receive the signals, and a buffer configured to store data conveyed by or representing the protocol data units for transmission to the receiving node according to the automatic repeat request process, wherein each of the protocol data units has a sequence number defining their position in a predetermined order, the sequence number being fixed in a specification of the mobile communications system or configurable by a network of the mobile communications system, and wherein the controller circuitry is configured in combination with the transmitter circuitry and the buffer, to detect based on the sequence number of one or more of the protocol data units, the predetermined criteria are satisfied, and, in response to transmit a polling bit to the receiving node in the one or more of the protocol data units for which the sequence number satisfies the predetermined criteria.

2. Circuitry according to claim 1, wherein the protocol data units each include a header which is at least partly pre-generated to include the sequence number of the each of the protocol data units.

3. Circuitry according to claim 1, wherein the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer to receive from the receiving node an indication that one or more of the protocol data units have not been successfully received by the receiving node, to re-transmit from the buffer the one or more of the protocol data units which have not been successfully received by the receiving node, and to advance the sliding window according to the second value, such that memory of the buffer is freed at locations at which are stored each of the protocol data units in the predetermined order which have been successfully received before the one or more protocol data units which have not been successfully received.

4. Circuitry according to claim 1, wherein the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer to receive from the receiving node an indication that all of the protocol data units up to and including the protocol data unit having a sequence number equal to the second value, and to advance the sliding window according to the second value, such that memory of the buffer is freed at locations at which are stored each of the protocol data units in the predetermined order which have been successfully received before the one or more protocol data units which have not been successfully received.

5. Circuitry according to claim 1, wherein the predetermined criteria comprises the sequence number of the one or more of the protocol data units being equal to one of one or more predetermined values of sequence numbers, the one or more predetermined values of sequence numbers being known by the transmitting device and the receiving device.

6. Circuitry according to claim 1, wherein the predetermined criteria comprises the sequence number of the one or more of the protocol data units being equal to one of one or more values of sequence numbers configured by the mobile communications system and provided to the transmitting node and the receiving node.

7. Circuitry according to claim 1, wherein the controller circuitry is configured in combination with the transmitter circuitry, the receiver circuitry and the buffer to receive from the receiving node, in response to the polling bit, a status report comprising a negative acknowledgement for one or more protocol data units which were not successfully received by the receiving node, and to re-transmit to the receiving node the one or more protocol data units which were not successfully received by the receiving node.

8. Circuitry according to claim 1, wherein the controller circuitry is configured in combination with the transmitter circuitry and the buffer to detect that the next of the protocol data units to be transmitted is the last protocol data unit being transmitted from the buffer, and to transmit a polling bit to the receiving node along with the next of the protocol data units to be transmitted.

9. Circuitry according to claim 1, wherein the controller circuitry is configured in combination with the transmitter circuitry and the buffer to detect that the number of protocol units or the number of bytes stored in the buffer exceeds a predetermined threshold, and in response to transmit a polling bit to the receiving node along with the next of the protocol data units to be transmitted.

10. Circuitry for a receiving node operating with a mobile communications system comprising:

receiver circuitry configured to receive signals representing protocol data units formed from one or more service data units via a wireless access interface of the mobile communications system from a transmitting node of the mobile communications system according to an automatic repeat request process, transmitter circuitry configured to transmit signals to the transmitting node via the wireless access interface, and controller circuitry configured to control the transmitter circuitry to transmit the signals and to control the receiver circuitry to receive the signals, wherein each of the protocol data units has a sequence number defining their position in a predetermined order, and wherein the controller circuitry is configured in combination with the receiver circuitry to detect based on the sequence number of one or more of the protocol data units, that predetermined criteria are satisfied, and, in response to transmit a status report message comprising a negative acknowledgement for one or more protocol data units which were not successfully received, and wherein the controller circuitry is configured in combination with the transmitter circuitry and the buffer to detect that the next of the protocol data units to be transmitted is the last protocol data unit being transmitted from the buffer, or to detect that the number of protocol units or the number of bytes stored in the buffer exceeds a predetermined threshold, and, in response, to transmit a polling bit to the receiving node along with the next of the protocol data units to be transmitted.

11. Circuitry according to claim 10, wherein the protocol data units each include a header which is at least partly pre-generated to include the sequence number of the each of the protocol data units.

12. Circuitry according to claim 10, wherein the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer
- to receive from the receiving node an indication that one or more of the protocol data units have not been successfully received by the receiving node,
- to re-transmit from the buffer the one or more of the protocol data units which have not been successfully received by the receiving node, and
- to advance the sliding window according to the second value, such that memory of the buffer is freed at locations at which are stored each of the protocol data units in the predetermined order which have been successfully received before the one or more protocol data units which have not been successfully received.

13. Circuitry according to claim 10, wherein the buffer comprises a sliding window which represents protocol data units which have been transmitted by the transmitting node but not yet successfully acknowledged by the receiving node, an upper edge of the sliding window being set to a first value equal to a sequence number to be assigned for a next newly generated protocol data unit at the transmitting node and a lower edge of the sliding window being set to a second value equal to a sequence number of a next protocol data unit for which a successful acknowledgement is to be received from the receiving node in the predetermined order, and the controller circuitry is configured in combination with the transmitter circuitry, the receiver circuitry and the buffer
- to receive from the receiving node an indication that all of the protocol data units up to and including the protocol data unit having a sequence number equal to the second value, and
- to advance the sliding window according to the second value, such that memory of the buffer is freed at locations at which are stored each of the protocol data units in the predetermined order which have been successfully received before the one or more protocol data units which have not been successfully received.

14. Circuitry according to claim 10, wherein the predetermined criteria comprises the sequence number of the one or more of the protocol data units being equal to one of one or more predetermined values of sequence numbers, the one or more predetermined values of sequence numbers being known by the transmitting device and the receiving device.

15. Circuitry according to claim 10, wherein the predetermined criteria comprises the sequence number of the one or more of the protocol data units being equal to one of one or more values of sequence numbers configured by the mobile communications system and provided to the transmitting node and the receiving node.

16. Circuitry according to claim 10, wherein the controller circuitry is configured in combination with the transmitter circuitry, the receiver circuitry and the buffer to receive from the receiving node, in response to a polling bit, a status report comprising a negative acknowledgement for one or more protocol data units which were not successfully received by the receiving node, and
- to re-transmit to the receiving node the one or more protocol data units which were not successfully received by the receiving node.

17. A method of controlling communications at a transmitting node operating with a mobile communications system, the method comprising:
- transmitting signals representing protocol data units formed from one or more service units via a wireless access interface of the mobile communications system to a receiving node of the mobile communications system according to an automatic repeat request process, wherein each of the protocol data units has a sequence number defining their position in a predetermined order,
- storing data conveyed by or representing the protocol data units transmitted to the receiving node according to the repeat request process in a buffer,
- detecting based on the sequence number of one or more of the protocol data units, the predetermined criteria are satisfied, and, in response
- transmitting a polling bit to the receiving node in the one or more of the protocol data units for which the sequence number satisfies the predetermined criteria.

* * * * *